Sept. 3, 1935.                C. V. CLARKE                2,013,033
              BRAKE OPERATING MECHANISM FOR USE WITH TRAILERS
                      Filed Nov. 22, 1933        3 Sheets-Sheet 3

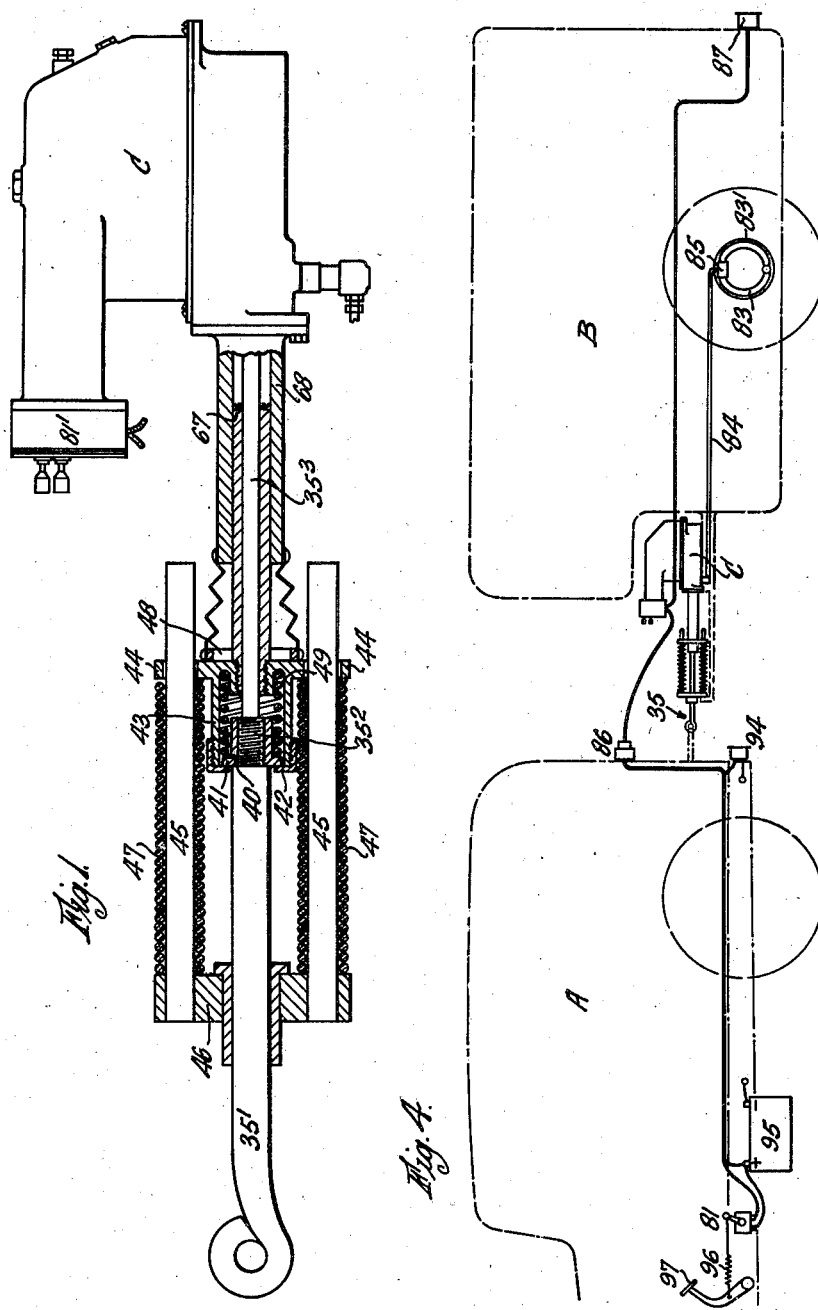

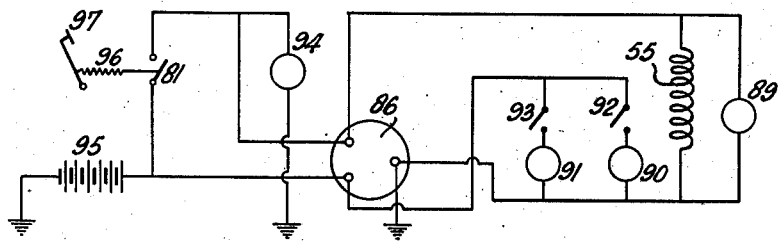
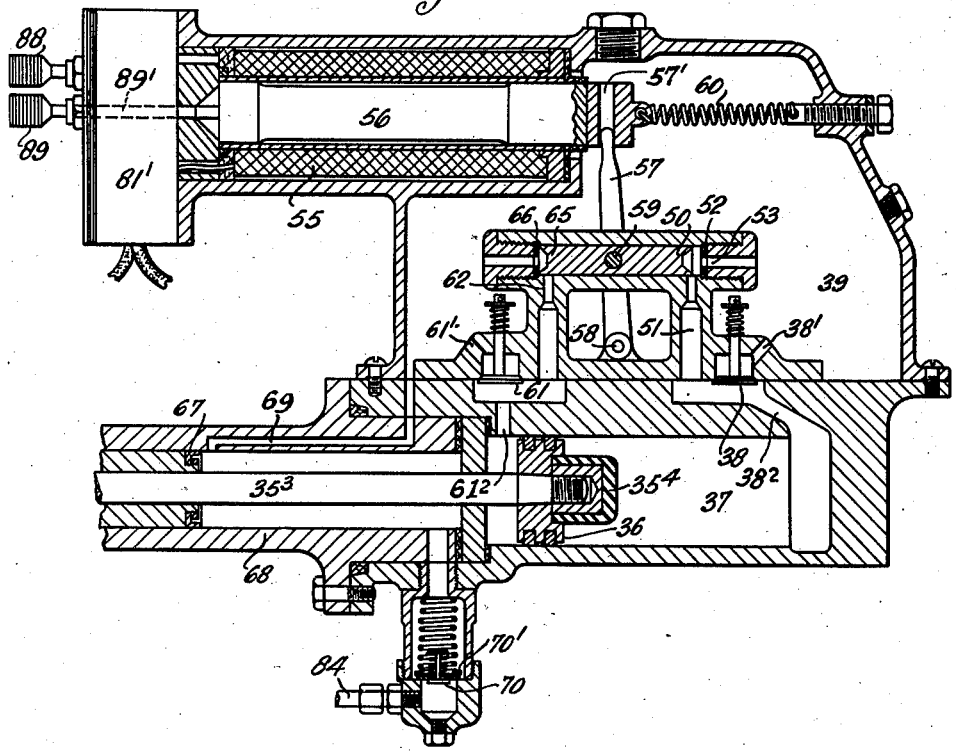

Inventor:
Cecil Vandepeer Clarke;
By his attorneys,
Baldwin & Wight

Patented Sept. 3, 1935

2,013,033

UNITED STATES PATENT OFFICE 2,013,033

BRAKE OPERATING MECHANISM FOR USE WITH TRAILERS

Cecil Vandepeer Clarke, Bedford, England

Application November 22, 1933, Serial No. 699,283
In Great Britain November 29, 1932

17 Claims. (Cl. 188—3)

This invention relates to brake operating mechanism for use with trailers.

Figure 3:
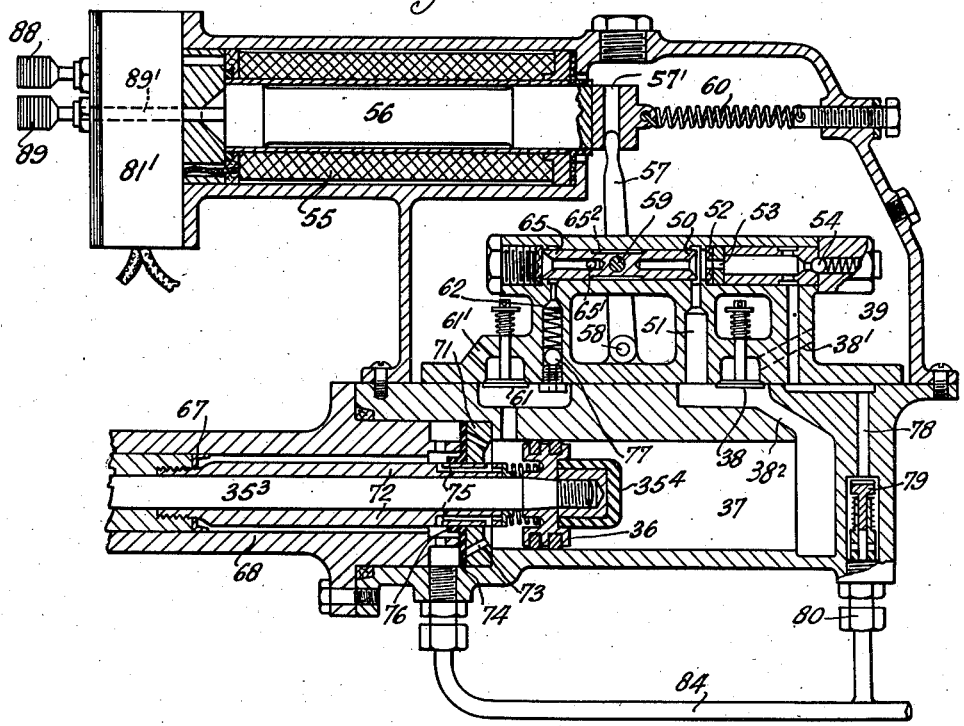
Figure 6:
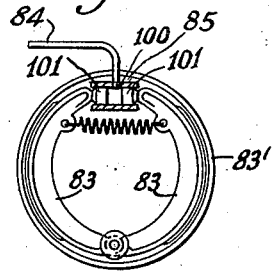

The invention is illustrated in the accompanying drawings in which Figure 1 is a section partly in elevation and Figure 2 a sectional view to a larger scale of part of the mechanism shown in Figure 1, Figure 3 a sectional view of a modified arrangement, Figure 4 a general view showing the apparatus according to the invention applied to towing and towed vehicles and Figure 5 a wiring diagram. Figure 6 is a detail view showing a fluid motor operated brake on an enlarged scale.

Referring firstly to Figure 4, which shows in diagrammatic form the application of the invention, A is a towing vehicle and B a towed vehicle connected through a draw bar 35 to the towing vehicle A, the draw bar being placed in operative connection with the towed vehicle B through a ram and cylinder mechanism denoted generally by C now to be described.

Referring now to Figures 1 and 2, the draw bar 35 is connected to a ram 36 working in a cylinder 37 secured to the towed vehicle B, the draw bar being formed with three diameters $35^1$, $35^2$, $35^3$ of which the largest diameter part is formed with an eye, the intermediate part with a screw thread, and the smallest part connected to the ram 36. 38 is an automatic non-return valve which permits oil (or other fluid) to pass from a reservoir 39 through a passage $38^1$ and a passage $38^2$ and into the right hand end of the cylinder when the draw bar and hence the ram are moved to the left as seen in the drawings, this movement occurring when the towing vehicle A accelerates with respect to the towed vehicle. The draw bar is provided with a sleeve 49 which is screwed on to the threaded part $35^2$ of the draw bar and has a flange 41 engaging a flange 42 on a sleeve 43 having ears or flanges 44 which slide on guide rods 45 secured to a bracket 46 carried by any convenient fixed part of the towed vehicle B. Between this bracket 46 and the ears or flanges 44 are interposed springs 47 and it will be seen that by reason of the flanges 41 and 42 the movement of the draw bar due to acceleration will cause these springs 47 to be loaded.

As soon as the movement of the draw bar ceases, which occurs when the loading of the springs 47 equalizes the tractive load, the valve 38 closes and oil drawn into the cylinder is trapped and thus prevents reverse movement of the draw bar 35, and the springs 47 are held loaded by the trapped oil. Between the flange 41 and a flange 48 formed on the sleeve 43 there is interposed a spring 49 for a reason hereinafter referred to.

A second valve 50 arranged for manual operation is provided whereby the trapped oil can be allowed to escape from the right hand end of the cylinder. This valve normally closes a passage 51 in communication with the right hand end of the cylinder 37, and provides a double closure; one closure is formed by the end peripheral portion of the valve 50 which directly seals the passage 51 and the other closure is provided by boring and bevelling the end face of the valve and arranging for the sharp ridge thus formed to co-operate with a valve seating 52 for a central aperture 53. When the valve is moved to the open position (in which position it is shown in the drawing) communication is established between the aperture 53 and the passage 51 and thus oil is allowed to escape to the reservoir 39.

A similar arrangement of valves is employed for the left hand end of the cylinder 37, the ram 36 thus being double acting; thus the left hand end of the cylinder is provided with a spring loaded inlet non-return valve 61 which allows oil to be drawn from the reservoir 39 through a passage $61^1$ and a passage $61^2$ into the left hand end of the cylinder when the ram moves to the right due to deceleration of the towing vehicle A with respect to the towed vehicle B, and trapping this oil when this movement of the ram ceases; this end of the cylinder is also provided with a passage 62 arranged to be opened and closed to the reservoir by a manually operable valve 65 similar to the valve 50 operating to provide a double closure, there being provided a valve seating member 66, this valve 65 enabling the oil trapped in the left hand end of the cylinder to escape. The outlet valves for both ends of the double acting ram and cylinder arrangement are arranged for simultaneous but reverse operation so that when one is opened the other is closed; to effect this the valves are formed as a single piston valve so that when the valve moves to close one passage 51 it opens the other passage 62. It will now be seen that when the valve 50, 65 is operated to open the passage 62, the draw bar can move to the left but is prevented from reversing (i. e. moving to the right) as long as the valve remains in this position; when, however, the valve 50, 65 is reversed (i. e. moved to the position shown in the drawing) to open the passage 51 the draw bar can move to the right but is prevented from reversing (i. e. moving to the left) until the valve 50, 65 is again moved to the right. These movements of the draw bar are utilized to effect operation of the brakes on the towed vehicle and for this purpose the sleeve 43 is associated with brake operating mechanism in the manner hereinafter referred to; the association is such that movement when permitted of the draw bar to the left (corresponding to acceleration of the towing vehicle A with respect to the towed vehicle B) effects release of the brakes which are held released until the draw bar is permitted to reverse; when this reverse is permitted the brakes are applied with the assistance of the springs 47 and are held applied despite traction applied through the draw bar until the draw bar is again permitted to move to the left, the brake actuating operation thus being under the control of the valve 50, 65.

The valve 50, 65 is arranged for manual control from the towing vehicle and it is preferred that transmission for effecting valve actuation shall be effected electrically for the reason that operative connection can readily be established between the operating and operative parts on the towing and towed vehicles respectively. This is effected by the provision of a solenoid 55 which is arranged to be energized by a switch 81 on the towing vehicle and the armature 56 of which is slotted or grooved to receive a lever 57 pivotally mounted at 58 and connected by a pin 59 to the valve 50, 65 the armature being biased by a spring 60 to move into a position corresponding to the closure of the passage 51. It will be seen that when the switch 81 on the towing vehicle is closed to energize the solenoid, the armature thereof is moved to the left (into the position shown) and the valve 50, 65 is operated to allow the escape of oil from the right hand end of the cylinder and thus to permit the reapplication of the brakes on the towed vehicle.

The additional spring 49 transmits an additional braking force when very rapid retardation of the towing vehicle occurs or when the towing vehicle is held on an up-gradient by the brakes of the towed vehicle. For example, if the brakes of the towing vehicle completely fail, by changing into a lower gear without acceleration of the engine, a sudden momentary retardation can be obtained, and the resulting momentary over-running force will increase the force of application of the trailer brakes, and if the latter are of ample proportions, will ensure that both vehicles are brought to a rest in a reasonable distance.

It is preferred to provide a definite limit to the braking effort and this is effected by providing the end of the draw bar 35 with a cap 35$^4$ of resilient material and adapted to abut against the end wall of the cylinder thus resiliently checking the movement of the draw bar.

The mechanism previously described is associated with the brakes of the towed vehicle, (the brake shoes and brake drum being indicated at 83, 83$^1$ in Figure 4), through an hydraulic braking system in which a master hydraulic ram and cylinder arrangement is arranged to be moved and to transmit an impulse through a liquid in pipe line 84 to a spring or otherwise biased ram and cylinder arrangements 85 in operative connection with the brakes 83. To effect this the master ram and cylinder is incorporated as an integral part of the structure of the control system, this arrangement being carried into effect as follows: there is provided a second ram 67 and cylinder 68 the ram being in the form of a sleeve surrounding the draw bar and being screw threaded at its outer end to the sleeve 43. In its simplest form, the ram and cylinder arrangement is such that a connection between the annular cylinder 68 and the reservoir 39 is established by a passage 69 which is opened by the second ram 67 when the draw bar is at or near the end of its movement due to acceleration of the vehicle A with respect to the vehicle B: this second cylinder is provided with a spring loaded outlet valve 70 which when the piston valve 50 is opened to effect application of the brake is opened by the fluid pressure created in the second cylinder 68 by the second ram 67 and this pressure is transmitted through the fluid in the pipe line 84 to the brake operating cylinder and ram arrangements 85 to effect application of the brakes 83. A second spring loaded valve 70$^1$ concentric with the valve 70 is also provided, this second valve being caused to open by the drop in pressure created by the movement of the second ram 67 when the draw bar is permitted to move to release the brake; this allows liquid to return to the cylinder 68 of the master ram; any deficiency or excess in the quantity of liquid contained in the system between the master and operating ram or rams is made good by the opening of the passage 69.

When an hydraulic system is employed in connection with large towed vehicles (for example 8–10 ton trailers) a considerable quantity of oil (or other fluid) has to be displaced into the cylinders containing the brake operating rams, while at the same time a high pressure has to be exerted: these effects have to be obtained from a comparatively short stroke of the master ram and to achieve this the modification shown in Figure 3 is employed. The parts in the arrangement shown in Figure 3 which correspond to the parts in the arrangement shown in Figures 1 and 2 are for convenience in understanding the modification given similar reference numerals. It will be seen that firstly the passage 69 and the spring loaded outlet valve 70 and inlet valve 70$^1$ are dispensed with. Secondly the left hand end of the cylinder 37 is employed as a feed chamber for the master cylinder 68, oil being displaced by the ram 36 from the cylinder 37 to the cylinder of the master ram when the draw bar is moved to release the brakes. Thirdly, the greater part of the supply of oil to the system is effected by displacement from the right hand end of the cylinder 37. Thus, there is provided between the left hand end of the cylinder 37 and the right hand end of the master cylinder 68 a partition 71 in which slides a sleeve 72 secured to the master ram 67 so as to reduce the effective area thereof and to enable a high pressure to be developed. The partition is provided with apertures 73 covered by a resilient washer 74 functioning as a flap valve and the sleeve 72 is provided with passages 75 which, when the draw bar is at or near the end of its out-stroke are uncovered by an annular portion 76 of the washer 74 to place the master cylinder into communication with the left hand end of the cylinder 37. The passage 62 is moreover, provided with a spring loaded non-return valve 77 which determines the lowest value (which is preferably of about 10 lbs. per square inch) at which oil can return to the reservoir; the valve selected is such as will operate to prevent or reduce the tendency of air from entering the system.

Moreover, the aperture 53 opens to a non-return valve 54 loaded to a pressure of say 50 lbs. per square inch and there is provided a passage 78 which opens to the non-return valve 50 and also to a non-return valve 79 which is lightly spring loaded so as to close when the pressure in the pipe line 84, to which the valve 79 is connected by the connector 80, rises above that determined by the valve 54.

When the ram 36 moves on its forward stroke (i. e. to the left as seen in the drawings the draw bar is moved to release the brakes) oil which had been drawn into the left hand end of the cylinder 37 is forced through the apertures 73 into the master cylinder 68. Excess oil (if any) is allowed to return to the reservoir past the valve 77 when the biasing pressure thereof is overcome, the excess oil which is delivered to the master cylinder returning through the passages 75 when uncovered by the part 76 of the washer 74. It will be understood that the ram 36 and draw bar 35 will be held by the oil trapped in the right hand end of the cylinder 37 as has previously been described.

If now the solenoid be actuated so as to cause the valve 50 to release the oil trapped in the right hand end of the cylinder 37 the rams 36, 67, will be caused by the springs 47 to move to the right and the oil in the right hand end of the cylinder 37 will be displaced through the now open valve 50 and aperture 53, thence to the passage 78 and so to the pipe line of the system, the maximum pressure developed by this action is that determined by the valve 54 (i. e. 50 lbs. per square inch) and this action is sufficient to cause the brake operating ram to be displaced so as to bring the brake shoes into contact with the drums with a pressure of 50 lbs. per square inch. At the same time however, that the ram 36 is creating this displacement and building up this pressure, the ram 67 is also building up a pressure, so that the valve 79 is subjected to opposing pressures, one created by the ram 36 and the other created by the ram 67. When the pressure created by the ram 67 exceeds that created by the ram 36 (which latter pressure cannot exceed the pressure determined by the valve 54), the valve 79 automatically closes and during the remainder of the stroke the ram 36 discharges past the valve 54 into the reservoir. The ram 67 being of small effective diameter and hence producing a high pressure intensity now transmits a high pressure through the oil to the brake shoe operating rams to produce the final high pressure braking effect, this pressure may readily be produced up to a value of 1,000 lbs. per square inch.

It will be apparent that the spring 49 permits the ram 67 to create an increased pressure under the conditions already referred to: it will also be understood that, as has previously been described oil drawn into the left hand end of the cylinder will be prevented from returning to the reservoir 39 by the valve 65 and thus the brakes will remain applied until the solenoid is de-energized.

It may be noted that the valve 65 when open permits oil to discharge to the reservoir 39 through a port 65¹ opening into an annular groove 65² which itself communicates with the slot through which the pin 59 passes.

Electrical connection between the solenoid on the towed vehicle B and the switch 81 on the towing vehicle A is preferably effected by a plug and socket connector 86 and conveniently there is employed a multiple-way plug and socket device, so as to feed not only the solenoid but also tail stop and reversing lamps on the towed vehicle, the casing for the lamps being indicated at 87 in Figure 4. For this purpose there is employed a junction switch box 81 mounted on the solenoid casing and having push-pull switches for controlling the lamp circuits and one of which is shown in Figure 3 at 88. A circuit diagram is shown in Figure 5 in which the stop, tail and reversing lamps of the towed vehicle B are indicated at 89, 90 and 91, the push-pull switches for the tail and reversing lights at 92, 93, the stop lamp for the towing vehicle at 94, and a feed battery 95. It will be seen from the diagram that when the switch 81 is closed, not only is the solenoid 55 energized but also the stop lamps on the vehicles A and B. The armature 56 of the solenoid may if desired have fast with it a rod 89¹ which extends through the junction box 81¹ and has an operating knob 89 by means of which the rod 89¹ can be moved by hand (i. e., independently of electrical control) to effect application or release of the brakes by causing movement of the valve 50, 65.

Preferably the switch controlling the solenoid is actuated against a light spring 96 by the foot pedal 97 controlling the brakes on the towing vehicle, the spring insuring that the trailer brake is applied during the initial movement of the foot pedal so that the brakes on the towed vehicle are applied before those on the towing vehicle, this arrangement thus providing a graduated degree of braking effort.

The one or more brake operating ram and cylinder arrangements may be of any known kind and may for example each consist of a cylinder 100 having therein opposed rams 101 between which the operating liquid is introduced and which abut at their outer ends against the brake shoes which are drawn towards one another by a spring in the usual manner: thus, when the master ram is moved by reason of the movement produced on the draw bar by its spring the liquid displaced by the master ram effects separation of the opposed rams and hence applies the brake shoes to the brake drum; when the master ram is moved in the reverse direction by reason of the movement of the draw bar due to acceleration, liquid is displaced from between the opposed rams which are caused to move towards one another by the spring acting on the brake shoes.

This mechanism is well known to those skilled in the art and therefore further description is believed to be unnecessary.

What I claim is:—

1. In brake operating means for use on a vehicle towed by a towing vehicle, a device connecting the two vehicles while yet permitting relative movement between them, automatic means for holding the vehicles against relative movement in both directions. operator operated means for rendering the holding means inoperative to permit selectively relative movement between the vehicles in one direction or the other, brake operating means on the towed vehicle and means whereby the selective relative movement effects operation of the brake operating means, the relative movement in one direction effecting brake release operation and in the other direction effecting brake application.

2. In brake operating means for use on a vehicle towed by a towing vehicle, a device connecting the two vehicles while yet permitting relative movement between them, fluid pressure means for holding the vehicles against relative movement in both directions, operator operated means for rendering the fluid pressure means inoperative to permit selectively relative movement between the vehicles in one direction or the other, brake operating means on the towed vehicle and means whereby the selective relative movement effects operation of the brake operating means, the relative movement in one direction effecting brake release operation and in the other direction effecting brake application.

3. In brake operating means for use on a vehicle towed by a towing vehicle, a device connecting the two vehicles while yet permitting relative movement between them, fluid pressure means which operate automatically to hold the vehicles against relative movement in both directions, a first valve means for so relieving fluid pressure that relative movement between the vehicles is permitted in one direction, a second valve means for so relieving fluid pressure that relative movement between the vehicles is permitted in the other direction, operator operated means controlling the valve means so that as one is rendered operative the other is rendered inoperative so that relative movement between the vehicles is selectively permitted in one direction or the other, brake operating means on the towed vehicle and means whereby the selective relative movement effects operation of the brake operating means, the relative movement in one direction effecting brake release operation and in the other direction effecting brake application.

4. In brake operating means for use on a vehicle towed by a towing vehicle, a double acting ram and cylinder arrangement one part of which is operatively connected to one of the vehicles and the other part operatively connected to the other vehicle, a source of fluid supply, an automatic inlet valve for each side of the arrangement, an outlet valve for each side of the arrangement, operator operated means controlling the outlet valves so that as one opens the other closes, the arrangement thus permitting the two parts of the arrangement to move relatively in one direction or the other by opening one of the outlet valves and being prevented from reversing until the other outlet valve is opened whereby relative movement between the vehicles is selectively permitted in one direction or the other, brake operating means on the towed vehicle, means whereby the selective relative movement effects operation of the brake operating means, the relative movement in one direction effecting brake release operation and in the other direction effecting brake application, an energy storing device which is loaded by the relative movement causing brake release and in unloading assists the brake application operation.

5. Means as claimed in claim 4 and in which the two outlet valves are constituted by a single double acting valve member.

6. In brake operating means for use on a vehicle towed by a towing vehicle, a double acting ram and cylinder arrangement one part of which is operatively connected to one of the vehicles and the other part operatively connected to the other vehicle, a source of fluid supply, an automatic inlet valve for each side of the arrangement, an outlet valve for each side of the arrangement, electrically operated means controlling the outlet valves, an operator operated switch mechanism controlling the circuit of the electrically operated means so that as one outlet valve opens the other closes, the arrangement thus permitting the two parts of the arrangement to move relatively in one direction or the other by opening one of the outlet valves and being prevented from reversing until the other outlet valve is opened whereby relative movement between the vehicles is selectively permitted in one direction or the other, brake operating means on the towed vehicle, means whereby the selective relative movement effects operation of the brake operating means, the relative movement in one direction effecting brake release operation and in the other direction effecting brake application, an energy storing device which is loaded by the relative movement causing brake release and in unloading assists the brake application operation.

7. In brake operating means for use on a vehicle towed by a towing vehicle, a device connecting the two vehicles while yet permitting relative movement between them, automatic means for holding the vehicles against relative movement in both directions, operator operated means for rendering the holding means inoperative to permit selectively relative movement between the vehicles in one direction or the other, brake operating means on the towed vehicle and an hydraulic transmission system whereby the selective relative movement effects operation of the brake operating means, the relative movement in one direction effecting brake release operation and in the other direction effecting brake application.

8. In brake operating means for use on a vehicle towed by a towing vehicle, a double acting ram and cylinder arrangement one part of which is operatively connected to one of the vehicles and the other part operatively connected to the other vehicle, a source of fluid supply, an automatic inlet valve for each side of the arrangement, an outlet valve for each side of the arrangement, operator operated means controlling the outlet valves so that as one opens the other closes, the arrangement thus permitting the two parts of the arrangement to move relatively in one direction or the other by opening one of the outlet valves and being prevented from reversing until the other outlet valve is opened whereby relative movement between the vehicles is selectively permitted in one direction or the other, an hydraulic transmission system operating the brake operating means and itself operated by the selective relative movement to effect operation of the brake operating means, the relative movement in one direction effecting brake release operation and in the other direction effecting brake application.

9. In brake operating means for use on a vehicle towed by a towing vehicle, a double acting ram and cylinder arrangement, one part of which is operatively connected to one of the vehicles and the other part operatively connected to the other vehicle, a source of fluid supply, an automatic inlet valve for each side of the arrangement, an outlet valve for each side of the arrangement, operator operated means controlling the outlet valves so that as one opens the other closes, the arrangement thus permitting the two parts of the arrangement to move relatively in one direction or the other by opening one of the outlet valves and being prevented from reversing until the other outlet valve is opened whereby relative movement between the vehicles is selectively permitted in one direction or the other, an hydraulic brake transmission system comprising a second ram and cylinder arrangement one part of which is operatively connected to the towed vehicle and the other part to that part of the first ram and cylinder arrangement which is operatively connected to the other vehicle, whereby the selective relative movement between the two parts of the first ram and cylinder arrangement is transmitted to the two parts of the second ram and cylinder arrangement, an hydraulically actuated brake operating mechanism for operating the brakes on the towed vehicle, and a conduit connecting the cylinder of the second ram and cylinder to the said mechanism, whereby the relative movement in one direction causes brake release operation and in the other direction causes brake application, an energy storing device which is loaded by the relative movement causing brake release and in unloading assists the brake application operation.

10. In brake operating means for use on a vehicle towed by a towing vehicle, a source of liquid supply, a double acting hydraulic check device taking its supply from the source and one part of which is connected to one of the vehicles and the other part to the other vehicle, the device operating to prevent relative movement in either direction between the vehicles, operator operated valve means for permitting discharge of liquid selectively from one side or the other of the device so as to permit relative movement in one dirction or the other between the two parts of the device and hence between the two vehicles, hydraulically actuated brake operating means operating brakes on the towed vehicle and an hydraulic transmission system operated by the relative movement to cause the operation of the brake operating means, and a connection between the device and the system whereby liquid discharged from one side of the device is fed to the system, the relative movement in one direction causing brake release operation and in the other direction causing brake application operation.

11. In brake operating means for use on a vehicle towed by a towing vehicle, a double acting ram and cylinder arrangement one part of which is operatively connected to one of the vehicles and the other part operatively connected to the other vehicle, a source of liquid supply, an automatic inlet valve for each side of the arrangement, an outlet valve for each side of the arrangement, operator operated means controlling the outlet valves so that as one opens the other closes, the arrangement thus permitting the two parts of the arrangement to move relatively in one direction or the other by opening one of the outlet valves and being prevented from reversing until the other outlet valve is opened whereby relative movement between the vehicles is selectively permitted in one direction or the other, an hydraulic brake transmission system comprising a second ram and cylinder arrangement one part of which is operatively connected to the towed vehicle and the other part to that part of the first ram and cylinder arrangement which is operatively connected to the other vehicle whereby the selective relative movement between the two parts of the first ram and cylinder arrangement is transmitted to the two parts of the second ram and cylinder arrangement, an hydraulically actuated brake operating mechanism for operating the brakes on the towed vehicle, and a conduit connecting the cylinder of the second ram and cylinder to the said mechanism, a second conduit between one side of the cylinder of the first ram and cylinder arrangement and the hydraulic system whereby liquid discharged through one of the outlet valves is fed to the system and the relative movement in one direction between the second ram and cylinder transmits through the liquid brake application pressure to the brake operating means while relative movement in the other direction effects brake release operation.

12. The combination with the arrangement claimed in claim 11 of valve means which operates to limit the pressure at which liquid is fed to the system and which operates to prevent the reversal of flow of liquid when the pressure in the system rises above that of the discharge liquid.

13. The combination with the arrangement claimed in claim 11 of an energy storing device which is loaded by the relative movement causing brake release and in unloading assists the brake application operation.

14. An arrangement as claimed in claim 9 and in which the second ram and cylinder are of annular form and the second ram is mounted on a draw bar extension of the first ram.

15. An arrangement as claimed in claim 9 and in which the operator operated means comprises an electrically operable device and in which there is provided an operator operated switch controlling the circuit of the device.

16. An arrangement as claimed in claim 9 and in which the two outlet valves are formed by a single double acting valve in operative connection and in which there is provided an operator operated switch controlling the circuit of the device.

17. In brake operating means for use on a vehicle towed by a towing vehicle, an hydraulic double acting check device for preventing relative movement between the two vehicles, operator operated means controlling the discharge of liquid from the check device to enable relative movement in one direction or the other to be effected, an hydraulic brake operating system utilizing the relative movement to effect release or application of brakes on the towed vehicle and means whereby liquid discharged from the check device to permit brake application movement is fed to the hydraulic system there to transmit brake application pressure.

CECIL VANDEPEER CLARKE.